United States Patent
Ghosal et al.

(10) Patent No.: US 7,289,527 B2
(45) Date of Patent: Oct. 30, 2007

(54) ADMISSION CONTROL IN NETWORKED SERVICES

(75) Inventors: Sugata Ghosal, New Delhi (IN); Neeran M Karnik, New Delhi (IN); Akshat Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1076 days.

(21) Appl. No.: 10/317,358

(22) Filed: Dec. 12, 2002

(65) Prior Publication Data

US 2004/0114514 A1    Jun. 17, 2004

(51) Int. Cl.
*H04B 7/212* (2006.01)

(52) U.S. Cl. ............... 370/444; 370/230; 370/443

(58) Field of Classification Search ........... 370/444, 370/230, 443
See application file for complete search history.

(56) References Cited

U.S. PATENT DOCUMENTS

2002/0198995 A1* 12/2002 Liu et al. ............... 709/226
2003/0105868 A1* 6/2003 Kimbrel et al. ......... 709/226

OTHER PUBLICATIONS

An Admission Control Scheme for Predictable Server Response Time for Web Acesses, Xianping Chen, Prasant Mohapatra and Huamin Chen, WWW10, May 1-5, 2001, Hong Kong.
A Cost-Based Admission Control Algorithm for Handling Mixed Workloads in Multimedia Server Systems, Ing-Ray Chen and Sheng-Tun Li, ICPADS (IEEE Conference on Parallel and Distributed Systems), Jun. 2001, Kyongju, Korea, pp. 543 to 548.

* cited by examiner

*Primary Examiner*—Huy D. Vu
*Assistant Examiner*—Jason Mattis
(74) *Attorney, Agent, or Firm*—Gibb &Rahman, LLC

(57) ABSTRACT

Prediction-based online admission control for incoming jobs has an explicit objective of optimizing a utility function. The input to an algorithmic procedure is a set of requests made in respect of a network service. Each request has information about the length of the request. An output of the algorithmic procedure is a selected subset of requests that can be served within the capacity constraints of the network service, such that the utility function is approximately optimized (for example, minimized or maximized) depending on the context of the particular application.

34 Claims, 8 Drawing Sheets

ADMISSION CONTROL IN NETWORKED SERVICES

FIELD OF THE INVENTION

The present invention relates generally to networked services, and relates more particularly to admission control decisions made in respect of the provision of networked application services.

BACKGROUND

An existing admission control strategy used in the provision of web-hosting services is a "tail-dropping" strategy, which rejects a job when the queue length exceeds a specified bound. Chen et al (An Admission Control Scheme for Predictable Server Response Time for Web Accesses, 10*th International World Wide Web Conference*, May 2001, Hong Kong) present a prediction-based admission control scheme that decides to accept or reject jobs based on the predicted workload.

This prediction-based strategy described by Chen et al is an improvement over the existing tail-dropping strategy. Using such a prediction-based strategy incorporates variable workload, rather than simply specifying conditions in which jobs are dropped, per the existing tail-dropping strategy.

The approach described by Chen et al is certainly an improvement over existing techniques. This approach, however, is still relatively unsophisticated. Issues relating to commercial provision of networked services are unaddressed by the control strategy proposed by Chen et al. Thus, a need clearly exists for an improved manner of admission control for networked services.

SUMMARY

A prediction-based online admission control scheme for incoming jobs is described herein. This scheme has an explicit objective of optimizing a predetermined utility function. An algorithmic procedural approach is used. The input to the algorithmic procedure is a set of jobs to a network service. Each job carries information about the length of the job. The job, in this context, can either be a request or a connection depending on the granularity of the service. An output of the algorithmic procedure is a selected subset of jobs that can be served within the capacity constraints of the network service, such that the predetermined utility function is approximately optimized (for example, minimized or maximized) depending on the context of the particular application.

An algorithmic methodology is presented for admission control, for jobs characterized by (i) the reward such jobs generate when admitted, (ii) the penalty such jobs incur if rejected (or not served), and (iii) the service time required to perform the job, for a single resource. Information concerning incoming jobs is, of course, not available a priori. Rather, admission control decisions are made as jobs arrive. The described methodology is readily extended, as also described herein, for admission-controlled jobs that are serviced using multiple resources.

The interposition of a service proxy that provides admission control functionality has various associated advantages. The service can be operated remotely, and different services can be provided on different networked computers, while retaining a single contact point for clients. A balanced strategy is implemented, which takes into account the length of the job, the reward/penalty of the job and the estimated system utilization into account. Short-term prediction is used to adapt an offline strategy to appropriately work in an online context.

Criteria can be specified upon which to select jobs that are to be dropped. Hence, profits can be increased by servicing an "optimal" request set, which is advantageous in a variable workload environment typical of network-services.

An extension can be made to jobs that require multiple resources, either simultaneously or sequentially. An extension can also be made to service level agreements (SLAs) that have multiple gradations, instead of a binary follow/do not follow QoS condition.

DETAILED DESCRIPTION

Figure 1:
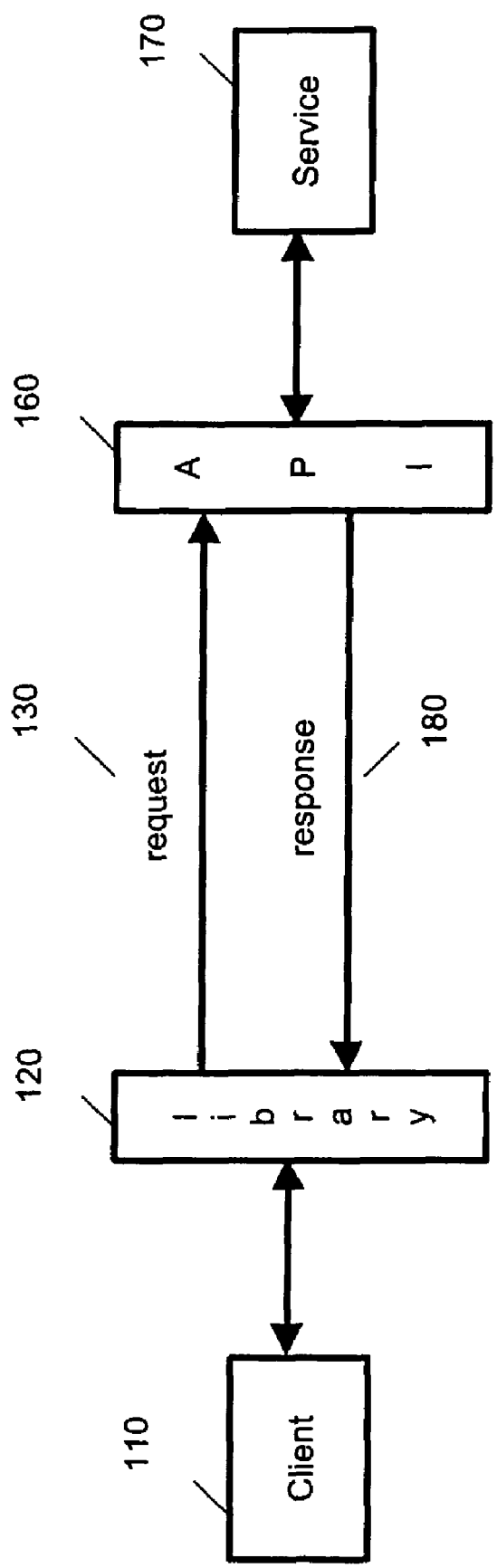
FIG. 1 is a schematic representation of a system architecture involving a client and a service that interact using a request/response model.

A network service is a remotely-accessible software program that offers a well-defined interface to its clients. Such an interface is typically referred to as an application programming interface (API). FIG. 1 schematically represents an architecture of a network service. Typically, a client 110 accesses a service 170 by sending requests 130 that conform to the service's API 160, using a library 120 provided to the client 110 by the service provider. The service 170 in turn processes the request 130 and returns a response 180.

Figure 2:
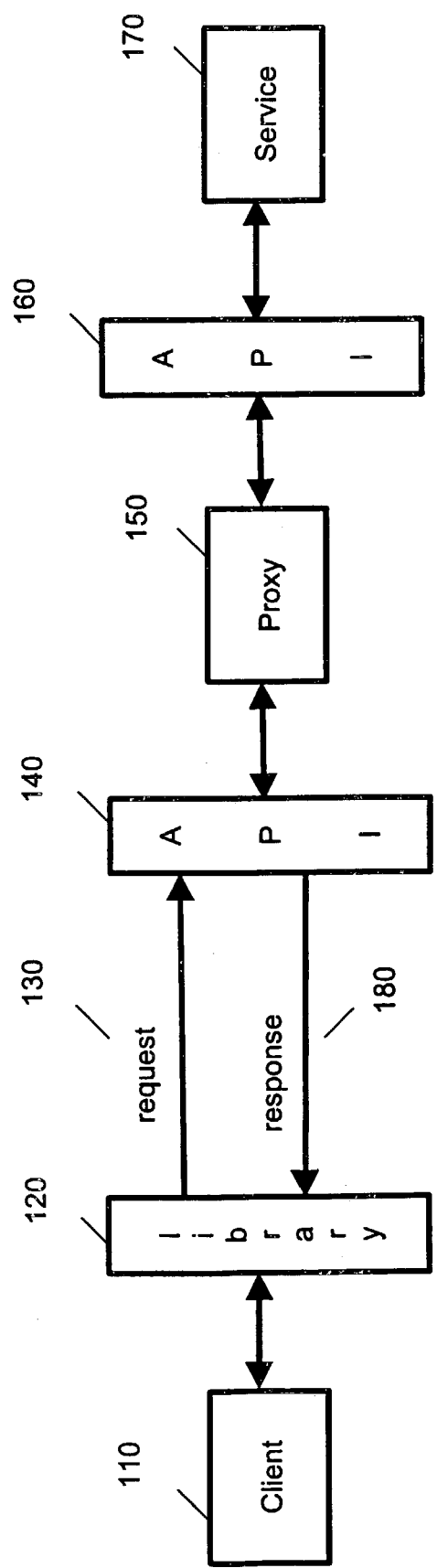
FIG. 2 is a schematic representation of a modified system architecture that introduces a proxy between the client and service represented in FIG. 1.

In the present case, this existing arrangement is modified by introducing a proxy between the client 110 and service 170, as schematically represented in FIG. 2. The proxy 150 offers the same interface (API 140) as the service 170 the proxy 150 represents. The client 110 therefore remains unaware of the interposition of the proxy 150. The proxy 150 interacts with the service 170 (which may be operated on a remote computer), and makes admission control decisions on behalf of the service 170.

Figure 3:
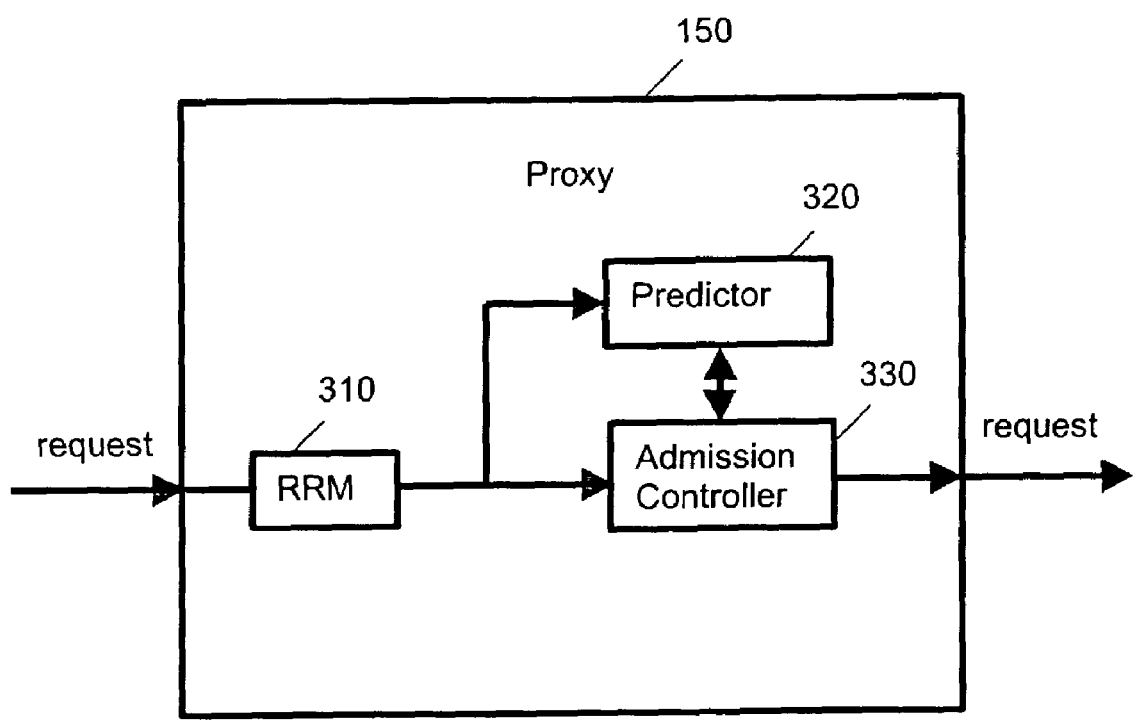
FIG. 3 is a schematic representation of the proxy represented in FIG. 2.

FIG. 3 schematically represents the internal structure of a proxy 150, which has three primary parts: a request-to-resource mapper (RRM 310), predictor 320 and admission controller 330. The RRM 310 maps attributes of a request to the expected resource requirements for serving the request. The predictor 320 makes a short-term prediction for the jobs and the corresponding service time distribution. The admission controller 330 decides whether to accept or reject a request, using techniques described in a subsection below, entitled "Admission control methodology".

EXAMPLE

Figure 4:
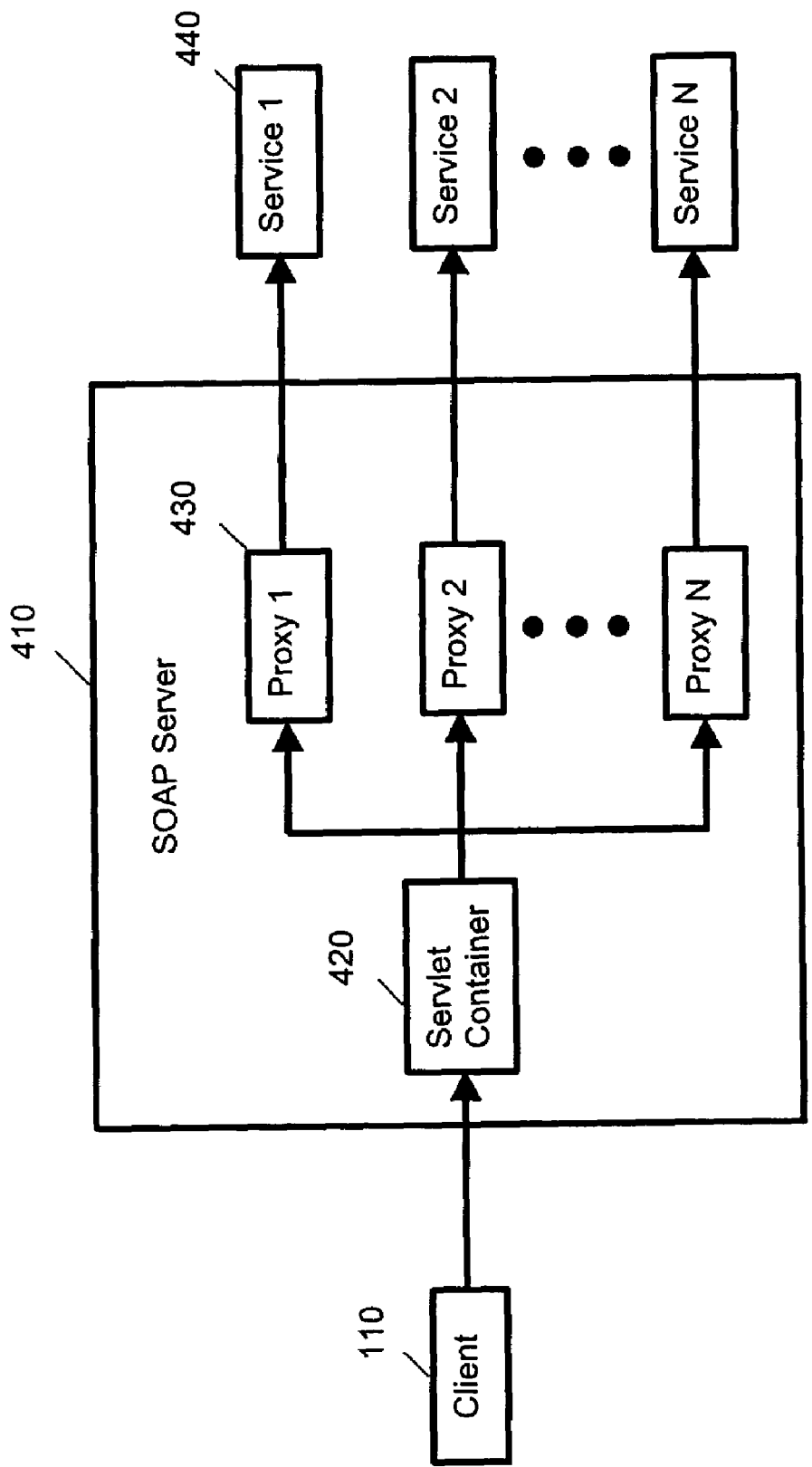
FIG. 4 is a schematic representation of an architecture of the type represented in FIG. 2, which can enforce request-level admission control.
Figure 5:
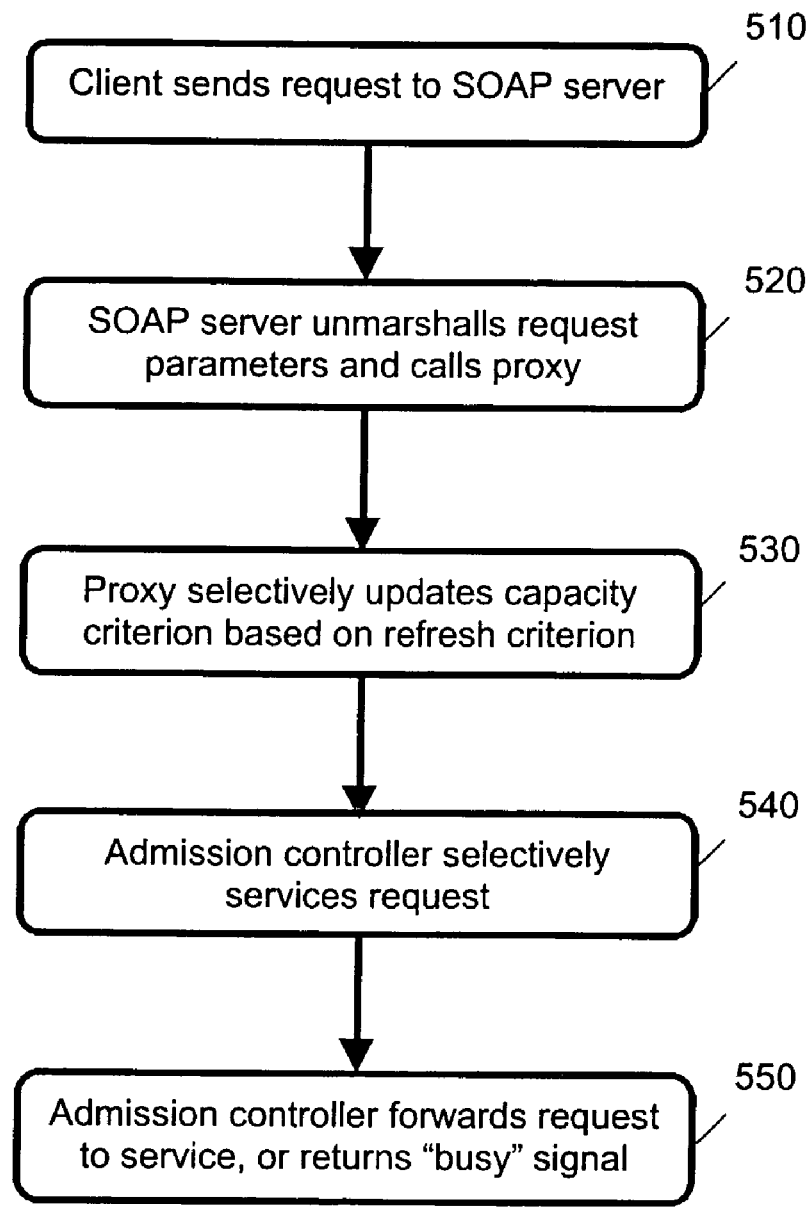
FIG. 5 is a flowchart of steps involved in controlling request-level admission control.

FIG. 4 schematically represents the architecture of a system that provides network services and has the ability to enforce request-level admission control. The network service (Service 1, Service 2, . . . Service N) is accessible over a network (the Worldwide Web in this example) using a specific set of standard protocols.

A client 110 typically sends requests 130 to the network service encoded using the SOAP protocol, with HTTP as the communication mechanism. These requests 130 are directed to a SOAP server 410, at a particular location on the Internet specified using a uniform resource locator (URL).

A SOAP server 410 has a Servlet Container 420 (which is a web server capable of running servlets) that receives the request and usually directs the request to the appropriate service 140 pre-registered with the Servlet Container 420. In the present case, a proxy 430 is substituted for each web service 440. That is, instead of registering a web service 440 with the SOAP server 410, its corresponding proxy 430 is instead registered. As before, the proxy 430 offers the same API as the service 440, and thus the client 110 and the SOAP server 410 remain unaware of this substitution.

The Refresh criterion is satisfied if the proxy has not fetched the estimated capacity utilization for the future from the service for the last n jobs or if a predetermined time T has elapsed, since the previous refresh.

Control Flow

Step 510 A client 110 sends a request to the SOAP server 410.

Step 520 The SOAP server 410 unmarshalls the request parameters of the request sent in step 610, and calls the appropriate proxy 430.

Step 530 The proxy 430 decides whether the proxy 430 needs to update its capacity information based on the Refresh criterion, outlined below. If so, the proxy 430 requests the service 440 to send the currently available capacity.

Step 540 The admission controller 330 decides whether to service the request using the techniques described below, which use the resource requirements provided by RRM 310, and the predictor 320 and the estimated capacity utilization of the service resources to arrive at a decision.

Step 550 If the admission controller 330 decides to service the request, the admission controller 330 forwards the request to the service 170 and awaits response. Otherwise, the admission controller 330 sends a "busy" response to the client 110.

Admission Control Methodology

More requests can be serviced if requests that collide with a only small number of other requests are scheduled. In this context, request $R_1$ is said to be colliding with another request $R_2$ if only one of the two requests $R_1$ and $R_2$ can be scheduled, while satisfying a resource capacity constraint determined by the capacity of the hardware that is used to service the requests.

If a request $R_1$ has an ending time greater than the ending time of request $R_2$, and $R_1$ and $R_2$ can both be started without violating the capacity constraint, then the conflict set of $R_1$ (that is, the set of all requests that collide with $R_1$) is a superset of the conflict set of $R_2$. Hence, if only one of $R_1$ and $R_2$ can be serviced, then $R_2$ is desirably serviced in preference to $R_1$.

A schedule of arriving requests is not known a priori when decisions are made to accept or reject requests. One recognizes, however, that requests have rewards and penalties associated with these requests. An objective then is to maximize the sum of available rewards taking into account incurred penalties.

As foreknowledge does not exist of when requests will arrive in future, admission control decisions are made based upon a prediction of the short-term future arrival of requests. A measure of profit per unit capacity is used as a criterion for making an admission control decision. A strategy is adopted that takes into account both the profit (rewards and penalties), and the length of the remaining job.

To further elaborate, when a request $R_1$ (having reward $r_1$ and an end time $d_1$) arrives, a decision horizon is defined as the time between the start and the end of the request $R_1$. A spare capacity array, called the available array, is computed for the decision horizon, based on the requests that are already scheduled. The available array is indexed against time. Each entry t in the array represents the amount of resource that is available at time t, if no further requests are admitted. Then capacity is pre-reserved for some of the jobs that are expected to arrive (based on the results of a short-term prediction over the decision horizon). The strategy is to pre-reserve capacity for an expected job $R_2$ (having reward $r_2$ and end time $d_2$), if the criteria of Equation (1) below is satisfied.

$$r_1 - r_2 < p(d_1 - d_2) \cdot (r_E + p_E) \quad (1)$$

In Equation (1) above, $p(d_1-d_2)$ represents the probability of a new job being serviced within $(d_1-d_2)$ duration; $r_E$ represents the expected reward of the job; and $p_E$ represents the expected penalty of the job.

If, after pre-reserving capacity for all such requests $R_2$ that satisfy Equation (1) above, spare capacity remains to schedule request $R_1$, then request $R_1$ is accepted. A request with a high reward has a higher chance of selection, as the relative reward $(r_1-r_2)$ is greater in value, and is not likely to be displacing capacity for future requests that might generate greater rewards. If, however, $r_1$ is relatively small then the inequality of Equation (1) above is satisfied. This is because if $r_1 < r_2$ then $r_1$ less $r_2$ is less than zero. Consequently, space for expected requests may be reserved in preference to scheduling the current request. This increases the chance of $R_1$ being rejected. Also, if a request has a large duration its end-time $d_1$ is later and, consequently, $p(d_1-d_2)$ is greater. Accordingly, capacity may be reserved for shorter jobs, thus causing $R_1$ to be rejected.

Table 1 below presents pseudo-code that describes the function of an admission control algorithm.

TABLE 1

1 function schedule
2 for every element j in the available capacity array
3     futureRequests [j] =

$$L * \sum_{i=1}^{d-j} (P(\text{serviceTime} = i) * f(d, i, j))$$

4     backlog = 0
5     for k = 1 to j
6         backlog = backlog + futureRequests [k] * P(serviceTime = (j − k))
7     end-for
8     capacityLeft = available [j] − (backlog + futureRequests [j])
9     if(capacityLeft ≦ 1)
10         return false
11     end-if
12 end-for TABLE 1-continued

```
13   return true
14   end function
```

In the pseudo-code of Table 1, f(d,i,j) is 1 if currentReward is less than or equal to the expectedReward and the probability of a new job arriving and finishing in (d–j–i) time, multiplied by penalty for rejecting a job. This is referred to as the High Profit Criteria.

The currentReward is the reward associated with the request under consideration, and expectedReward is the sum of the rewards of the current expected request and the expected request in the remaining time in the decision horizon, namely length of the available array—j.

The above-described methodology assumes that exact system capacity information is available when a request is received and an admission control decision is required. This, however, may not be the case, and two cases are outlined below. The above-described methodology extends to these two cases listed below.

Due to the refresh criterion, exact system information may not be available for the capacity utilized when the admission control decision is made (that is, when a request R arrives). The system information for requests that arrived until time $t_0$ is available and a new request arrives at time $t_1$ which is later than $t_0$. However, the request R can be replaced by a request R', which starts at to and has all other properties identical to R.

Request R' is assumed to clear part of the horizon from $t_0$ to $t_1$. That is, the algorithm is initialized with $j=t_1-t_0$. If the request R' clears the remaining horizon after reserving space for requests satisfying the HighProfit criterion, the request R is serviced. Instead of checking whether R should be serviced, the admission control criterion (ACC) is checked for another request R', and if R' clears the ACC, R is serviced.

In cases in which the request can be queued and serviced later (that is, a service level agreement between a service provider and a client has a turnaround time greater than the service time of the request), the request is continually tried to service. Consider an example of a request R of duration D that arrives at time to and has a turnaround time D+E. An attempt is made to schedule R at time $t_0$. If, however, this attempt fails at some time $t_1$ in the decision horizon, further attempt is made to schedule R at time $t_1$ (using the extended methodology described above, which compensates for the lack of information of requests which arrived in time $t_0$ to $t_1$). This procedure is repeated until either the request R is serviced or time $t_0+E$ elapses, in which case, the request is rejected.

Extensions

The above-described methodology can be extended when multiple resources are present. Capacity is reserved for expected requests that satisfy the profit per unit capacity criterion in all dimensions (resources). That is, the admission controller module is run with reservation for only those future requests that satisfy the High Profit Criteria for all resources.

Figure 6:
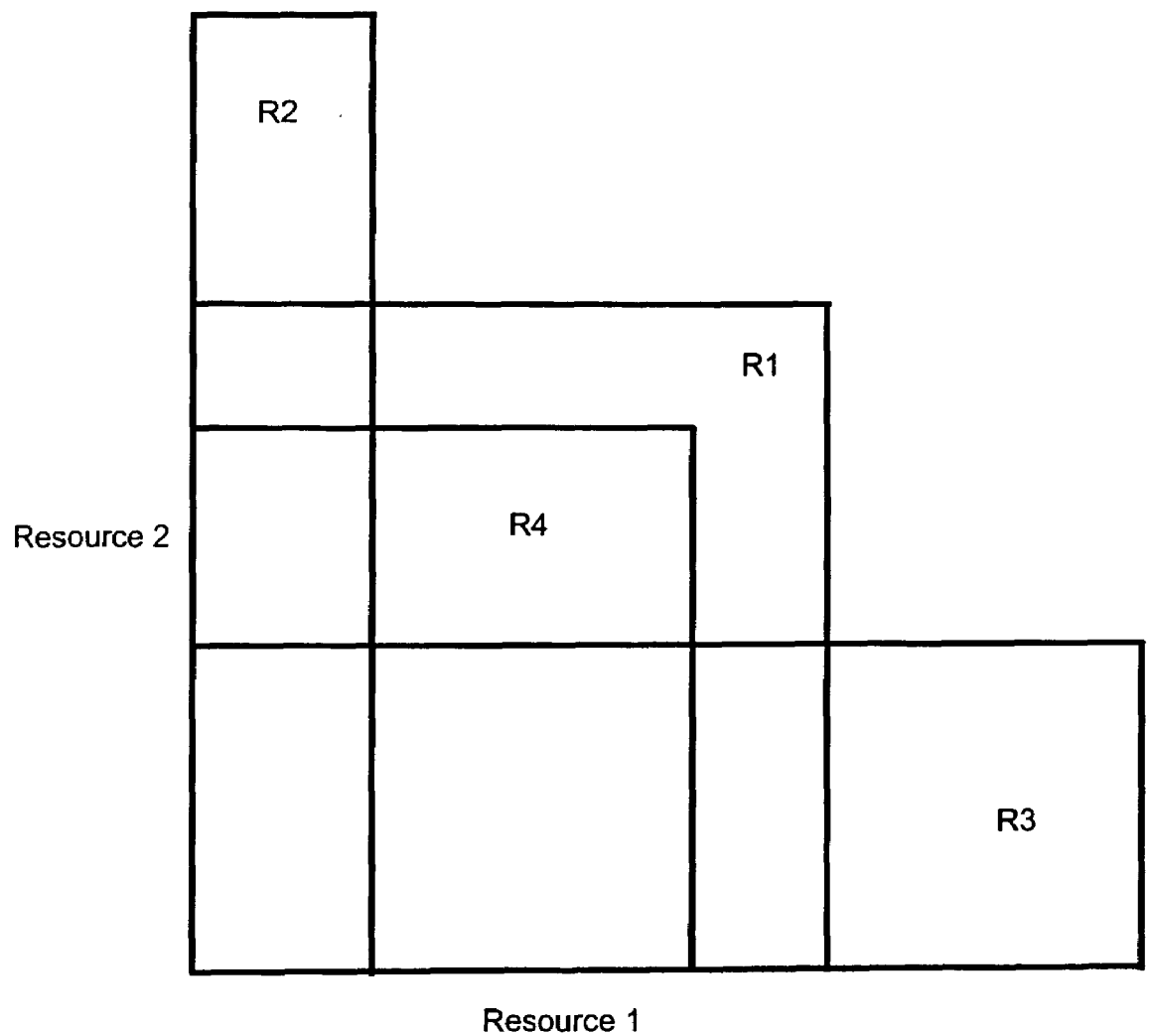
FIG. 6 is a schematic representation of an example of an extension of the described techniques to multiple resources.

A conservative estimate is made of expected requests, as expected rewards in the future are appropriately discounted to reflect the possibility that such rewards may not occur. For example, while making the admission control decision for $R_1$, resources 1 and 2 are reserved only for $R_4$ and not $R_2$ or $R_3$, which satisfy the High Profit Criterion for only one of the resources. On the other hand, $R_4$ satisfies the High Profit Criteria in all dimensions (resources). In this example, all requests are assumed to have the same reward and penalty. FIG. 6 schematically represents an example of this extension to multiple resources for requests $r_1$ and $r_2$.

The above-described methodology can be extended to cases in which a request requires multiple resources in a sequential manner. That is, if a request may require $r_1$ first and then $r_2$. In such a scenario, a check is made of whether all resources (that is, both $r_1$ and $r_2$) can be given to the request at the time the request requires such resources, after reserving resource for requests satisfying the HighProfit Criteria for individual resources. To elaborate, if a request needs resource 1 from time $t_1$ to $t_2$ and then resource 2 from $t_2$ to $t_3$, the request is serviced only if the request is able to access both resources 1 and 2. That is, the request is able to clear the AC algorithm for resource 1 at $t_1$ and resource 2 at $t_2$.

This methodology can also be extended to multiple-grade SLAs in which a client request has different rewards for different values of SLA parameters instead of a single value, which meets or does not meet the requirements of the SLA. For this modification, the request is not rejected outright if the request fails the admission control criteria for the best grade of its SLA. Instead, a check is made of whether the request can be serviced in the next grade specified in the SLA and so on, until service level grades are exhausted or the request can be serviced.

Computer Hardware and Software

Figure 7:
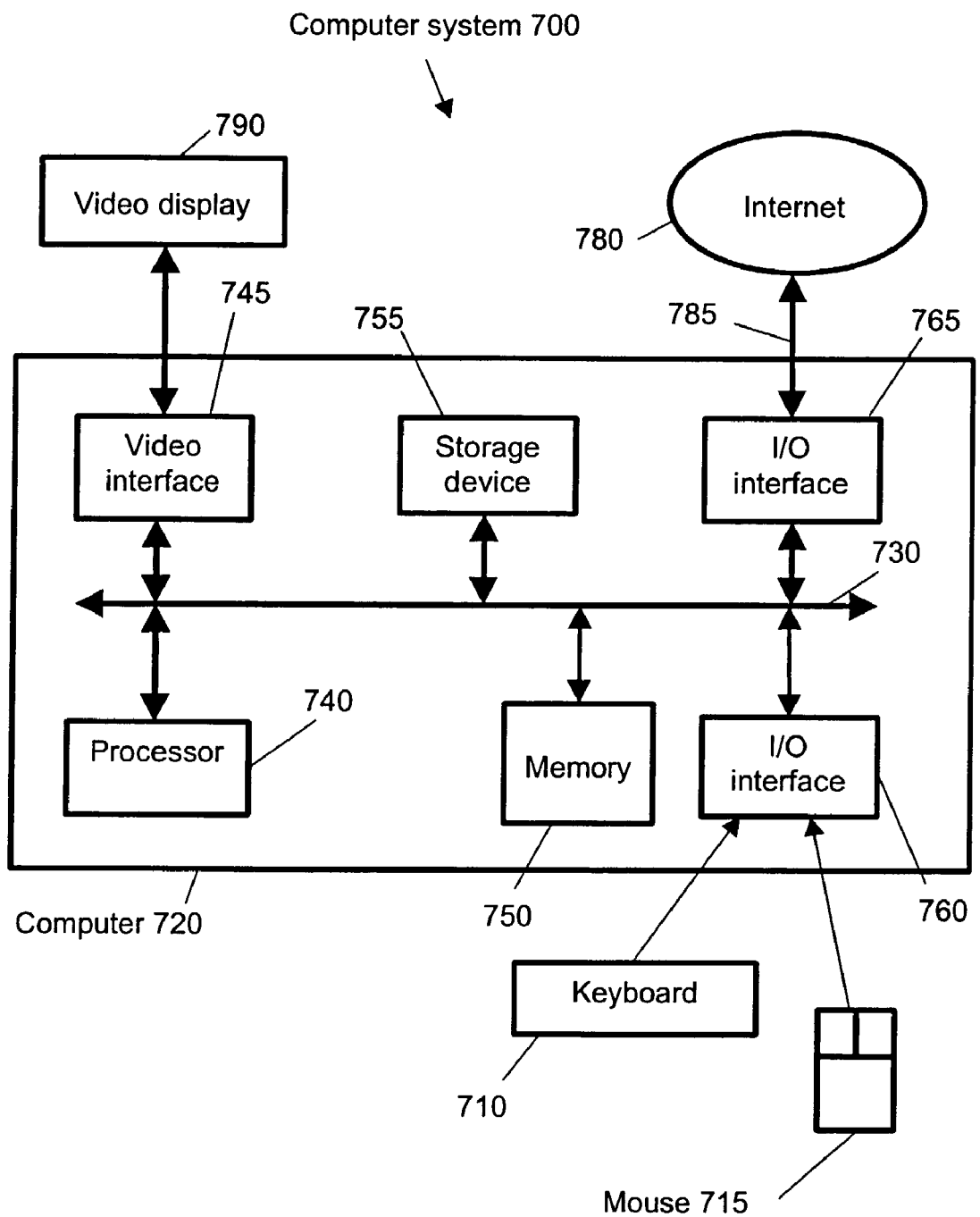
FIG. 7 is a schematic representation of a computer system suitable for performing the techniques described herein.

FIG. 7 is a schematic representation of a computer system 700 that can be used to perform steps in a process that implement the techniques described herein. The computer system 700 is provided for executing computer software that is programmed to assist in performing the described techniques. This computer software executes under a suitable operating system installed on the computer system 700.

The computer software involves a set of programmed logic instructions that are able to be interpreted by the computer system 700 for instructing the computer system 700 to perform predetermined functions specified by those instructions. The computer software can be an expression recorded in any language, code or notation, comprising a set of instructions intended to cause a compatible information processing system to perform particular functions, either directly or after conversion to another language, code or notation.

The computer software is programmed by a computer program comprising statements in an appropriate computer language. The computer program is processed using a compiler into computer software that has a binary format suitable for execution by the operating system. The computer software is programmed in a manner that involves various software components, or code means, that perform particular steps in the process of the described techniques.

The components of the computer system 700 include: a computer 720, input devices 710, 715 and video display 790. The computer 720 includes: processor 740, memory module 750, input/output (I/O) interfaces 760, 765, video interface 745, and storage device 755.

The processor 740 is a central processing unit (CPU) that executes the operating system and the computer software executing under the operating system. The memory module 750 includes random access memory (RAM) and read-only memory (ROM), and is used under direction of the processor 740.

The video interface 745 is connected to video display 790 and provides video signals for display on the video display 790. User input to operate the computer 720 is provided from input devices 710, 715 consisting of keyboard 710 and mouse 715. The storage device 755 can include a disk drive or any other suitable non-volatile storage medium.

Each of the components of the computer 720 is connected to a bus 730 that includes data, address, and control buses, to allow these components to communicate with each other via the bus 730.

The computer system 700 can be connected to one or more other similar computers via a input/output (I/O) interface 765 using a communication channel 785 to a network 780, represented as the Internet.

The computer software program may be provided as a computer program product, and recorded on a portable storage medium. In this case, the computer software program is accessed by the computer system 700 from the storage device 755. Alternatively, the computer software can be accessed directly from the network 780 by the computer 720. In either case, a user can interact with the computer system 700 using the keyboard 710 and mouse 715 to operate the programmed computer software executing on the computer 720.

The computer system 700 is described for illustrative purposes: other configurations or types of computer systems can be equally well used to implement the described techniques. The foregoing is only an example of a particular type of computer system suitable for implementing the described techniques.

Overview

A method, a computer system and computer software are described herein in the context of admission control for network services. In overview, the methodology described herein relates to a prediction-based strategy for deciding whether a job is accepted or rejected, based on attributes of the job. Such attributes include, for example, reward, penalty, resource requirements, and current resource utilization. By contrast, existing techniques take current resource utilization into account in admission control schemes.

Figure 8:
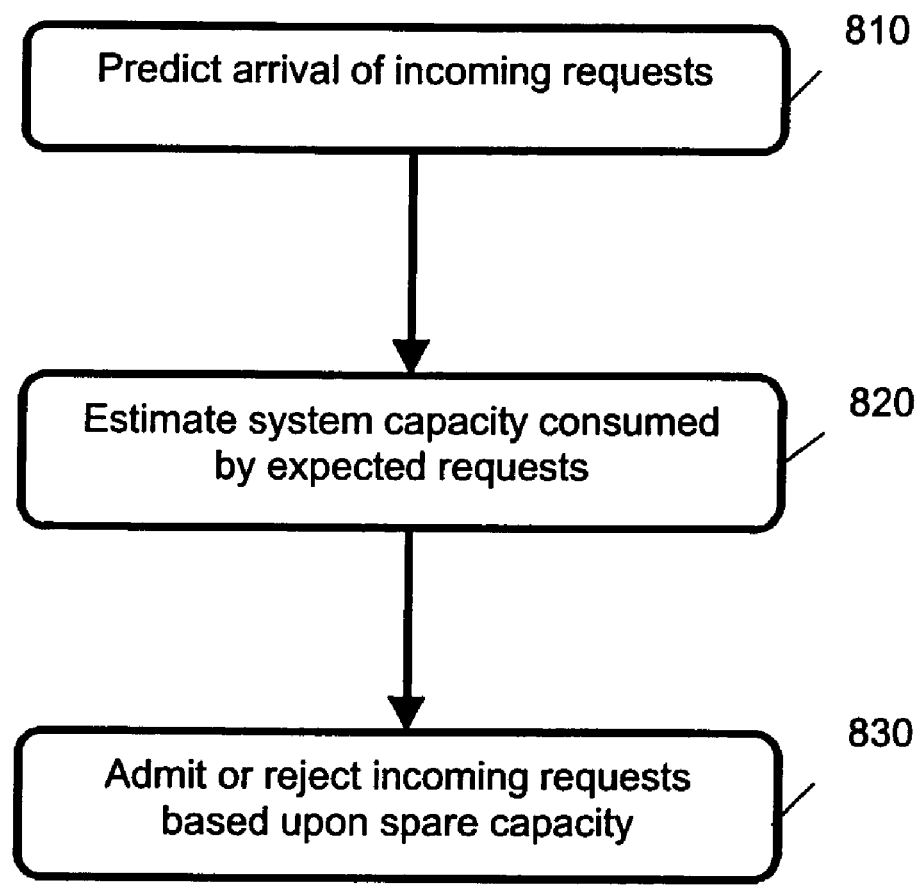
FIG. 8 is a flowchart of steps involved in admission control as described herein.

FIG. 8 flowcharts steps involved in the described procedure for admission control. In step 810, the arrival of incoming requests is predicted. In step 820, the system capacity consumed by the expected requests is estimated. In step 830, incoming requests are admitted or rejected based upon the estimated spare capacity available to service such requests.

The techniques described herein can be implemented with relatively little computation complexity, which is desirable for real-time implementation. The described algorithm is probably optimal in an offline, uni-dimensional job setting. An offline algorithm is one that assumes that a priori information is available concerning all the requests (and their service times) that will arrive in future. A uni-dimensional job setting denotes that there is a single resource that is admission controlled. The described algorithm uses prediction to simulate the offline algorithm in an online setting.

Various alterations and modifications can be made to the techniques and arrangements described herein, as would be apparent to one skilled in the relevant art.

We claim:

1. A method for admission control of requests for a network service, said method comprising:
receiving requests R, having associated parameters, for the network service;
estimating system capacity consumed by received requests R that are admitted for system servicing; and
selectively accepting or rejecting each received request R according to an admission control criterion, wherein the admission control criterion is based upon at least parameters associated with each received request R, spare system capacity, estimated as total system capacity less total system capacity estimated to be consumed by admitted requests, an estimate of expected requests, and parameters associated with said expected requests,
determining if two received requests R collide based upon whether said two received requests can be serviced using the spare system capacity;
defining a decision horizon T in which a received request R can be serviced;
applying an available capacity criterion at each time step t in the decision horizon T;
admitting a received request R only if the received request R meets the available capacity criterion at each time step t in the decision horizon T;
predicting expected requests $R_D$ that may arrive during the decision horizon T; and
pre-reserving capacity for selected expected requests $R_D$,
wherein capacity is pre-reserved for expected requests $R_D$ which satisfy a predetermined profitability criterion, and
wherein the predetermined profitability criterion is satisfied if an estimated probability of an expected request arriving and terminating during a remaining time in the decision horizon T after the expected colliding request $R_D$ is serviced, multiplied by a sum of reward and penalty of an expected request exceeds a difference in the rewards of the received request R and the expected colliding request $R_D$.

2. The method as claimed in claim 1, wherein the parameters associated with each received request R comprise at least an estimated time and system capacity required to service the received request R, and any of rewards and penalties associated with performing the received request R.

3. The method as claimed in claim 2, wherein the admission control criterion attempts to maximize profitability under a service level agreement, and the rewards and penalties associated with received requests R are specified by the service level agreement.

4. The method as claimed in claim 2, wherein the admission control criterion attempts to maximize the received requests that are serviced under a service level agreement, and the rewards and penalties associated with received requests R are made equal for all received requests R.

5. The method as claimed in claim 1, wherein the available capacity criterion is satisfied for a received request R if the received request R can be serviced after system capacity is pre-reserved for selected expected request $R_D$.

6. The method as claimed in claim 1, wherein said requests R are received at a SOAP server.

7. The method as claimed in claim 3, wherein said service level agreement comprises a multiple-grade service level agreement.

8. The method as claimed in claim 7, wherein said multiple-grade service level agreement comprises different rewards for different values of service level agreement parameters.

9. The method as claimed in claim 8, further comprising checking whether failed requests R can be serviced in a next grade specified in said service level agreement.

10. The method as claimed in claim 9, further comprising continuing the checking process until all service level grades are exhausted upon which said failed requests R are rejected.

11. The method as claimed in claim 9, further comprising continuing the checking process until said failed requests R can be serviced.

12. A computer system for admission control of requests for a network services, the computer system comprising:
- a receiver operable for receiving requests R, having associated parameters, for the network service;
- a calculator operable for estimating system capacity consumed by received requests R that are admitted for system servicing; and
- a controller operable for selectively accepting or rejecting each received request R according to an admission control criterion, wherein the admission control criterion is based upon at least parameters associated with each received request R, spare system capacity, estimated as total system capacity less total system capacity estimated to be consumed by admitted requests, and an estimate of expected requests, and parameters associated with said expected requests;
- a first component operable for determining if two received requests R collide, based upon whether said two received requests can be serviced using the spare system capacity;
- a second component operable for defining a decision horizon T in which a received request R can be serviced;
- a third component operable for applying an available capacity criterion at each time step t in the decision horizon T;
- a fourth component operable for admitting a received request R only if the received request R meets the available capacity criterion at each time step t in the decision horizon T;
- a fifth component operable for predicting expected requests $R_D$ that may arrive during the decision horizon T; and
- a sixth component operable for pre-reserving capacity for selected expected requests $R_D$,
- wherein capacity is pre-reserved for expected requests $R_D$ which satisfy a predetermined profitability criterion, and
- wherein the predetermined profitability criterion is satisfied if an estimated probability of an expected request arriving and terminating during a remaining time in the decision horizon T after the expected colliding request $R_D$ is serviced, multiplied by a sum of reward and penalty of an expected request exceeds a difference in rewards of the received request R and the expected colliding request $R_D$.

13. The computer system as claimed in claim 12, wherein the parameters associated with each received request R comprise at least an estimated time and system capacity required to service the received request R, and rewards and penalties associated with performing the received request R.

14. The computer system as claimed in claim 13, wherein the admission control criterion attempts to maximize profitability under a service level agreement, and the rewards and penalties associated with received requests R are specified by the service level agreement.

15. The computer system as claimed in claim 13, wherein the admission control criterion attempts to maximize the received requests that are serviced under a service level agreement, and the rewards and penalties associated with received requests R are made equal for all received requests R.

16. The computer system as claimed in claim 12, wherein the available capacity criterion is satisfied for a received request R if the received request R can be serviced after system capacity is pre-reserved for selected expected request $R_D$.

17. The computer system as claimed in claim 12, wherein said requests R are received at a SOAP server.

18. The computer system as claimed in claim 14, wherein said service level agreement comprises a multiple-grade service level agreement.

19. The computer system as claimed in claim 18, wherein said multiple-grade service level agreement comprises different rewards for different values of service level agreement parameters.

20. The computer system as claimed in claim 19, further comprising means for checking whether failed requests R can be serviced in a next grade specified in said service level agreement.

21. The computer system as claimed in claim 20, wherein the checking continues until all service level grades are exhausted upon which said failed requests R are rejected.

22. The computer system as claimed in claim 20, wherein the checking continues until said failed requests R can be serviced.

23. Computer software, recorded on a medium, performing a method for admission control of requests for a network service, the method comprising:
- receiving requests R, having associated parameters, for the network service;
- estimating system capacity consumed by received requests R that are admitted for system servicing; and
- selectively accepting or rejecting each received request R according to an admission control criterion, wherein the admission control criterion is based upon at least parameters associated with each received request R, spare system capacity, estimated as total system capacity less total system capacity estimated to be consumed by admitted requests, an estimate of expected requests, and parameters associated with said expected requests,
- determining if two received requests R collide based upon whether said two received requests can be serviced using the spare system capacity;
- defining a decision horizon T in which a received request R can be serviced;
- applying an available capacity criterion at each time step t in the decision horizon T;
- admitting a received request R only if the received request R meets the available capacity criterion at each time step t in the decision horizon T;
- predicting expected requests $R_D$ that may arrive during the decision horizon T; and
- pre-reserving capacity for selected expected requests $R_D$,
- wherein capacity is pre-reserved for expected requests $R_D$ which satisfy a predetermined profitability criterion, and
- wherein the predetermined profitability criterion is satisfied if an estimated probability of an expected request arriving and terminating during a remaining time in the decision horizon T after the expected colliding request $R_D$ is serviced, multiplied by a sum of reward and penalty of an expected request exceeds a difference in the rewards of the received request R and the expected colliding request $R_D$.

24. The computer software as claimed in claim 23, wherein the parameters associated with each received request R comprise at least an estimated time and system capacity required to service the received request R, and any of rewards and penalties associated with performing the received request R.

25. The computer software as claimed in claim 24, wherein the admission control criterion attempts to maximize profitability under a service level agreement, and the rewards and penalties associated with received requests R are specified by the service level agreement.

26. The computer software as claimed in claim 24, wherein the admission control criterion attempts to maximize the received requests that are serviced under a service level agreement, and the rewards and penalties associated with received requests R are made equal for all received requests R.

27. The computer software as claimed in claim 23, wherein the available capacity criterion is satisfied for a received request R if the received request R can be serviced after system capacity is pre-reserved for selected expected requests $R_D$.

28. The computer software as claimed in claim 23, wherein said requests R are received at a SOAP server.

29. The computer software as claimed in claim 25, wherein said service level agreement comprises a multiple-grade service level agreement.

30. The computer software as claimed in claim 29, wherein said multiple-grade service level agreement comprises different rewards for different values of service level agreement parameters.

31. The computer software as claimed in claim 30, further comprising checking whether failed requests R can be serviced in a next grade specified in said service level agreement.

32. The computer software as claimed in claim 31, further comprising continuing the checking process until all service level grades are exhausted upon which said failed requests R are rejected.

33. The computer software as claimed in claim 31, further comprising continuing the checking process until said failed requests R can be serviced.

34. A computer architecture operable for admission control of requests for a network services, the computer system comprising:

a plurality of client sites that generate requests R, having associated parameters, for the network service;

a server operable for receiving the received requests R from the client sites, estimating system capacity consumed by received requests R that are admitted for system servicing; and selectively accepting or rejecting each received request R according to an admission control criterion; and network devices, operatively connected with the server, operable for servicing received requests R that are accepted by the server, wherein the admission control criterion is based upon at least parameters associated with each received request R, spare system capacity, estimated as total system capacity less total system capacity estimated to be consumed by admitted requests, and an estimate of expected requests, and parameters associated with said expected requests;

means for determining if two received requests R collide based upon whether said two received requests can be serviced using the spare system capacity;

means for defining a decision horizon T in which a received request R can be serviced;

means for applying an available capacity criterion at each time step t in the decision horizon T;

means for admitting a received request R only if the received request R meets the available capacity criterion at each time step t in the decision horizon T;

means for predictin gexpected requests $R_D$ that may arrive during the decision horizon T; and means for pre-reserving capacity for selected expected requests $R_D$, wherein capacity is pre-reserved for expected requests $R_D$ which satisfy a predetermined profitability criterion, and wherein the predetermined profitability criterion is satisfied if an estimated probability of an expected request arriving and terminating during a remaining time in the decision horizon T after the expected colliding request $R_D$ is serviced, multiplied by a sum of reward and penalty of an expected request exceeds a difference in the rewards of the received request R and the expected colliding request $R_D$.

* * * * *